United States Patent
Nordangård et al.

(10) Patent No.: US 11,352,085 B2
(45) Date of Patent: Jun. 7, 2022

(54) CHILD BIKE SEAT AND METHOD OF ASSEMBLING A CHILD BIKE SEAT

(71) Applicant: Thule Sweden AB, Hillerstorp (SE)

(72) Inventors: Markus Nordangård, Värnamo (SE); Gustav Mauritzson, Jönköping (SE); Germund Larsson, Reftele (SE); Albert Nieuwenhuis, Geldermalsen (NL); Reinoud De Jong, Gorinchem (NL)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/143,834

(22) Filed: Jan. 7, 2021

(65) Prior Publication Data
US 2021/0214032 A1     Jul. 15, 2021

(30) Foreign Application Priority Data

Jan. 10, 2020   (EP) .................................. 20151147

(51) Int. Cl.
*B62J 1/16*      (2006.01)

(52) U.S. Cl.
CPC ...................... *B62J 1/16* (2013.01)

(58) Field of Classification Search
CPC ..... B62J 1/16; B62J 1/162; B62J 1/165; B62J 1/167; B60N 2/26
USPC ............... 297/219.12, 452.57, 452.18, 250.1
See application file for complete search history.

(56) References Cited

U.S. PATENT DOCUMENTS

| | | |
|---|---|---|
| 3,596,986 A | 8/1971 | Ragsdale |
| 3,934,934 A | 1/1976 | Farrell, Jr. et al. |
| 4,053,091 A | 10/1977 | Martelet |
| 4,440,331 A * | 4/1984 | Schimmels .......... B60N 2/2848 224/415 |
| 4,592,592 A | 6/1986 | Peek |
| 4,750,783 A | 6/1988 | Irby et al. |
| 5,299,818 A | 4/1994 | Newbold |
| 5,370,441 A | 12/1994 | Chuang |
| 5,850,958 A | 12/1998 | Belanger et al. |

(Continued)

FOREIGN PATENT DOCUMENTS

| | | |
|---|---|---|
| CN | 105163978 A | 12/2015 |
| CN | 204915785 U | 12/2015 |

(Continued)

OTHER PUBLICATIONS

Partial European Search Report and Provisional Written Opinion for European Application No. 20151147.4, European Patent Office (EPO), The Hague, The Netherlands, dated Jun. 12, 2020, 8 pages.

*Primary Examiner* — Milton Nelson, Jr.

(74) *Attorney, Agent, or Firm* — Sterne, Kessler, Goldstein & Fox P.L.L.C.

(57) ABSTRACT

A child bike seat includes a seat body having a seat shell for accommodating a child therein and a support structure for supporting the seat shell. The support structure includes two parts, with an edge portion of the seat shell disposed between the two parts of the support structure for holding the seat shell on the support structure. A method of assembling a child bike seat includes providing a frame part, arranging a seat shell for accommodating a child therein on the frame part, mounting a cover part to the frame part such that an edge portion of the seat shell is disposed between the frame part and the cover part.

19 Claims, 10 Drawing Sheets

(56) References Cited

U.S. PATENT DOCUMENTS

| | | | |
|---|---|---|---|
| 6,305,744 B1 | 10/2001 | Martin | |
| 6,612,645 B1 | 9/2003 | Hsu | |
| 6,652,034 B1 | 11/2003 | Schramm et al. | |
| 6,679,550 B2 * | 1/2004 | Goor | B60N 2/2806 297/216.11 |
| 7,506,926 B2 * | 3/2009 | Carine | B60N 2/885 297/216.12 |
| 7,517,011 B2 | 4/2009 | Aliev | |
| 7,523,986 B2 | 4/2009 | Jefferson et al. | |
| 7,673,934 B2 | 3/2010 | Bearup et al. | |
| 7,887,137 B2 | 2/2011 | Fisher et al. | |
| 7,909,400 B1 | 3/2011 | Delaney et al. | |
| 8,251,388 B2 | 8/2012 | Sauceda et al. | |
| 8,276,985 B2 * | 10/2012 | Kho | A47D 13/02 297/130 |
| 8,640,935 B2 | 2/2014 | Hagedoorn | |
| 8,851,569 B2 | 10/2014 | Ho | |
| 9,718,385 B2 * | 8/2017 | Yasuda | B60N 2/68 |
| 10,472,014 B2 * | 11/2019 | Wang | B62J 1/20 |
| 10,654,539 B2 | 5/2020 | Karelse et al. | |
| 2006/0267386 A1 | 11/2006 | Nakhla et al. | |
| 2010/0013187 A1 | 1/2010 | Oxley | |
| 2012/0180927 A1 | 7/2012 | Jane Santamaria | |
| 2016/0059748 A1 * | 3/2016 | Cohen | B60N 2/2806 297/183.7 |
| 2016/0075390 A1 | 3/2016 | Blom et al. | |
| 2016/0194043 A1 | 7/2016 | Buttle | |
| 2019/0365118 A1 * | 12/2019 | Stachowski | A47D 15/006 |

FOREIGN PATENT DOCUMENTS

| | | | |
|---|---|---|---|
| CN | 107792236 A * | 3/2018 | B62J 1/16 |
| DE | 9307485 U1 | 7/1993 | |
| DE | 10147934 A1 | 4/2003 | |
| DE | 202013011093 U1 * | 2/2014 | B62J 1/16 |
| DE | 202018002754 U1 * | 6/2018 | B62J 1/16 |
| DE | 102018112408 B3 * | 8/2019 | B62J 1/167 |
| EP | 2801514 A1 | 11/2014 | |
| EP | 3290312 A1 | 3/2018 | |
| GB | 2494246 A | 3/2013 | |
| JP | 4912987 B2 | 4/2012 | |
| JP | 2012153173 A | 8/2012 | |
| NL | 1036383 C2 | 6/2010 | |

* cited by examiner

CHILD BIKE SEAT AND METHOD OF ASSEMBLING A CHILD BIKE SEAT

CROSS REFERENCE TO RELATED APPLICATION

This application claims priority to EP Application No. 20151147.4, filed Jan. 10, 2020, which is hereby incorporated herein in its entirety by reference.

TECHNICAL FIELD

The present disclosure relates to a child bike seat, to a child bike seat mount and to a method of assembling a child bike seat.

BACKGROUND

Child bike seats, also referred to as bicycle child seats, are known in the art and exist in different configurations for carrying the child behind or in front of a cyclist. Known child bike seats comprise a seat and footrests for accommodating the child. Typically, the seat is made of a material which is sufficiently rigid to support the child during a bike ride. Such known child bike seats are, however, often uncomfortable for the child and manufacturing of such known child bike seats can be inefficient.

SUMMARY

Accordingly, it is desirable to at least address one of the foregoing and it can be the object of the disclosure to provide an improved child bike seat and an improved method of assembling a child bike seat.

In addition, other desirable features and characteristics will become apparent from the subsequent summary and detailed description, and from the appended claims, each taken in conjunction with the accompanying drawings and the background.

The object of the disclosure is solved by a child bike seat, a child bike seat mount and a method of assembling a child bike seat according to the independent claims. Advantageous further configurations are set out in the dependent claims.

Described in an aspect of the present disclosure is a child bike seat. The child bike seat is or may be configured as a rear child bike seat and/or a front child bike seat. The child bike seat may comprise a seat body. The seat body may comprise a seat shell for accommodating a child therein. The seat shell may be dimensioned for partly surrounding the child accommodated therein.

The seat body may also comprise a support structure for supporting the seat shell. The support structure may be made of a material which is sufficiently rigid to support the child in the seat shell during a bike ride. The support structure may be further made of a material which is sufficiently rigid to withstand vibrations that are caused during the bike ride. Thus, the seat shell itself may be made of a material which is not sufficiently rigid to support the child during a bike ride. Instead, the seat shell may be made of a soft material. The support structure and the seat shell may be made of different materials.

According to a preferable configuration, the support structure may comprise two parts. Thus, the support structure may be a two-component structure, for example a two-component frame. The two parts may be separate parts. An edge portion of the seat shell may be at least partly sandwiched between the two parts of the support structure for holding the seat shell on the support structure. The edge portion may at least partly extend along an outer boundary of the seat shell.

The at least partly sandwiched edge portion of the seat shell may be at least partly positioned between the two parts of the support structure. The support structure and the edge portion may form a three-layered structure with the edge portion in between of two layers of the support structure. A clamping force may be exerted or may not be exerted on the edge portion by at least one part of the two parts of the support structure. The support structure may cover at least a part of the edge portion.

According to a further preferable configuration, the support structure may comprise a frame part for supporting the seat shell. The frame part may be a framework comprising at least one material recess. The support structure may further comprise a cover part. The cover part may at least partly cover the frame part and/or the seat shell. The cover part may cover the frame part and/or the seat shell on a rear side of the child bike seat. The cover part may cover the frame part partly or entirely on the rear side. The seat shell may cover the frame part on a front side of the child bike seat. The seat shell may cover the frame part on the front side partly or entirely. Hence, the seat shell and the cover part may cover the frame part on opposite sides of the child bike seat. In other words, the frame part may be covered two-sided by the seat shell and the cover part.

According to an embodiment of the present disclosure, the cover part may be hooked into the frame part, wherein the cover part may comprise a hook and the frame part may comprise an engagement portion for engaging the hook.

The two parts of the support structure may comprise the frame part for supporting the seat shell and the cover part for at least partly covering the frame part. The edge portion of the seat shell may be at least partly sandwiched between the frame part and the cover part. The support structure may thus be configured for both supporting a child and holding the seat shell thereon.

According to an embodiment of the present disclosure, the edge portion of the seat shell is partly wrapped around one part of the two parts of the support structure, for example around the frame part. The edge portion may be arranged on at least two opposite sides of the one part of the two parts of the support structure, for example the frame part. The edge portion may be arranged on a front side and a rear side of the one part of the two parts of the support structure, for example the frame part.

According to a further embodiment of the present disclosure, the edge portion of the seat shell is at least partly clamped between the two parts of the support structure, for example between the frame part and the cover part, for holding the seat shell on the support structure. Thus, the edge portion of the seat shell may be at least partly wedged or squeezed between the two parts of the support structure, for example between the frame part and the cover part, for exerting a clamping force on the seat shell that can be necessary for holding the seat shell on the support structure.

According to a further embodiment of the present disclosure, at least one part of the two parts of the support structure, for example the frame part at least partially comprises a skeleton-like configuration. The skeleton-like configuration may comprise a Y-shaped skeleton portion. Alternatively or additionally, the skeleton-like configuration may comprise at least one of a X-shaped skeleton portion, a V-shaped skeleton portion and a W-shaped skeleton portion.

According to a further embodiment of the present disclosure, the two parts of the support structure, for example the frame part and the cover part, are fixedly coupled to each other by means of a positive locking coupling and/or a screw coupling. The positive locking coupling may be a snap-fit coupling or a click on coupling. The two parts of the support structure, for example the frame part and the cover part may be snapped, clicked or screwed together. Accordingly, the two parts of the support structure, for example the frame part and the cover part, may be configured for a mutual tool-free assembly or for a mutual tool assembly, respectively.

The frame part may comprise at least one mounting hole. The cover part may further comprise at least one receiving portion in which a fixation means that may be inserted in a mounting hole may be received. In one example, the fixation means may be a screw and the receiving portion may be a screw entry that may comprise an internal thread. The mounting hole may be arranged such that the inserted fixation means is accessible via an opening that may be provided in the seat shell. The fixation means may thus be accessible from the front side of the child bike seat. The fixation means may further be covered by the cover part at the rear side of the child bike seat. The fixation means may further be countersank or hidden in the seat shell and/or the frame part, wherein the fixation means may not protrude beyond the outer contour of the child bike seat. The child bike seat may thus comprise a clean rear design for design and safety reasons.

According to a further embodiment of the present disclosure, the seat shell comprises or is made of a polymer material. The polymer material may be or may comprise an ethylene-vinyl acetate material, for example an ethylene-vinyl acetate copolymer (also referred to as EVA). Alternatively or additionally, at least one part of the two parts of the support structure may comprise or may be made of a plastics material and/or a composite material. The composite material may be a fiber reinforced composite material, for example a glass reinforced plastic material.

According to a further embodiment of the present disclosure, the seat shell is held on the support structure in a floating manner. The seat shell may comprise a child seating area. The child seating area of the seat shell may be spaced apart from the support structure for providing a compensation space between the child seating area and the support structure. The compensation space may allow or provide a floating movement of a child sitting on the child seating area.

According to a further embodiment of the present disclosure, the seat shell may comprise arm rest portions. The arm rest portions may be integrally formed in said seat shell. Alternatively, the arm rest portions may be attached, for example screwed, to the support structure. The arm rest portions may be bulged. The arm rest portions may protrude from the seat shell, wherein a left arm rest portion may protrude from the left side of the seat shell providing a left arm rest for a left arm of a child when sitting in the child bike seat and wherein a right arm rest portion may protrude from the right side of the seat shell providing a right arm rest for a right arm of a child when sitting in the child bike seat. Alternatively or additionally to the arm rest portions, the child bike seat may also comprise a handle for gripping with at least one hand of a child when sitting in the child bike seat or a bracket for additionally securing the child when sitting in the child bike seat. The handle or bracket may be a central or lateral handle or bracket.

The support structure may comprise arm rest protrusions. The arm rest protrusions may support the arm rest portions of the seat shell. The arm rest protrusions may at least partly protrude into the arm rest portions. The arm rest protrusions may be at least partly received in the arm rest portions.

According to a further embodiment of the present disclosure, the support structure may comprise at least one reinforcement element for reinforcing the support structure at least in an edge portion thereof. The at least one reinforcement element may be arranged on the frame part. The at least one reinforcement element may be or may comprise at least one reinforcement rib.

Described in a further aspect of the present disclosure is a child bike seat mount. The child bike seat may comprise the child bike seat mount. The child bike seat mount may be arranged or may be configured to be arranged on the child bike seat. The child bike seat mount may be arranged or may be configured to be arranged below the child seating area of the child bike seat. The child bike seat mount may be arranged or may be configured to be arranged on a base portion of the support structure of the child bike seat and/or below the child seating area of the child bike seat. The base portion may be arranged below the child seating area.

The child bike seat mount may comprise a coupling portion. The coupling portion may be configured to be couplable with at least two different fixation modules for coupling the child bike seat mount to a bike. The coupling portion may be recessed in at least one part of the two parts of the support structure, for example in at least one of the frame part and the cover part.

According to an embodiment of the present disclosure, the coupling portion may comprise at least one sliding portion, for example a guiding track, for slidingly receiving the at least two different fixation modules. Alternatively or additionally, the coupling portion may comprise at least one fixation means for fixing the at least two different fixation modules to the coupling portion. The at least one fixation means may comprise at least one screw for screwing one of the two different fixation modules to the coupling portion.

According to a further aspect, a child bike seat mount system may comprise the child bike seat mount and at least one of the at least two different fixation modules. The coupling portion of the child bike seat mount may be configured to be couplable with the at least two different fixation modules for coupling the child bike seat mount in two different ways to a bike. According to a further aspect, a child bike seat system may comprise the child bike seat and the child bike seat mount system.

According to a further embodiment of the present disclosure, the at least two different fixation modules comprise a fixation module for coupling the child bike seat to a bike frame of the bike. The fixation module for coupling the child bike seat to a bike frame of the bike may be a first fixation module. Alternatively or additionally to the fixation module for coupling the child bike seat to a bike frame of the bike, the at least two different fixation modules may comprise a fixation module for coupling the child bike seat to a luggage rack of the bike. The fixation module for coupling the child bike seat to a luggage rack of the bike may be a second fixation module.

Described in a further aspect of the present disclosure is a method of assembling a child bike seat. The child bike seat may be at least partly configured as described with respect to the child bike seat according to the preceding aspect. The method may comprise a step of providing a frame part. The method may further comprise a step of arranging a seat shell for accommodating a child therein on the frame part.

The method may further comprise a step of mounting a cover part to the frame part. The mounting step may be performed for at least partly covering the frame part and/or the seat shell with the cover part. Thus, the method may further comprise the step of at least partly covering the frame part and/or the seat shell with a cover part.

According to a further preferable embodiment of the method, the arranging step may comprise partly wrapping an edge portion of the seat shell around the frame part. The edge portion may be a sandwiched edge portion. In other words, the edge portion may comprise an outer lip that is wrapped around the frame part.

According to a further preferable embodiment of the method, the mounting step can be performed such that an edge portion of the seat shell is sandwiched between the frame part and the cover part. The edge portion may be the partly wrapped edge portion according to the preceding preferable embodiment of the method. Hence, the mounting step may comprise a mounting of the cover part to the frame part such that an edge portion of the seat shell is sandwiched between the frame part and the cover part. Thus, the method may further comprise the step of sandwiching an edge portion of the seat shell between the frame part and the cover part. The frame part and the cover part may form a support structure on which the seat shell may be held. Thus, the method may further comprise a step of forming a support structure by means of the frame part and the cover part for holding the seat shell thereon.

According to a further embodiment of the present disclosure, the mounting step may further comprise a step of hooking the cover part into the frame part. Additionally, alternatively or subsequently, the mounting step may further comprise a step of pivoting the cover part onto the frame part.

According to a further embodiment of the present disclosure, the mounting step may comprise a step of establishing a positive locking coupling between the frame part and the cover part. This step may comprise a respective establishing of a snap-fit coupling and/or by means of a screw coupling.

Further aspects, configurations or embodiments of the present disclosure may be gained by combining any feature or any combination of features of at least one aspect, configuration and/or embodiment with any other feature or any other combination of features of at least one other aspect, configuration and/or embodiment. Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
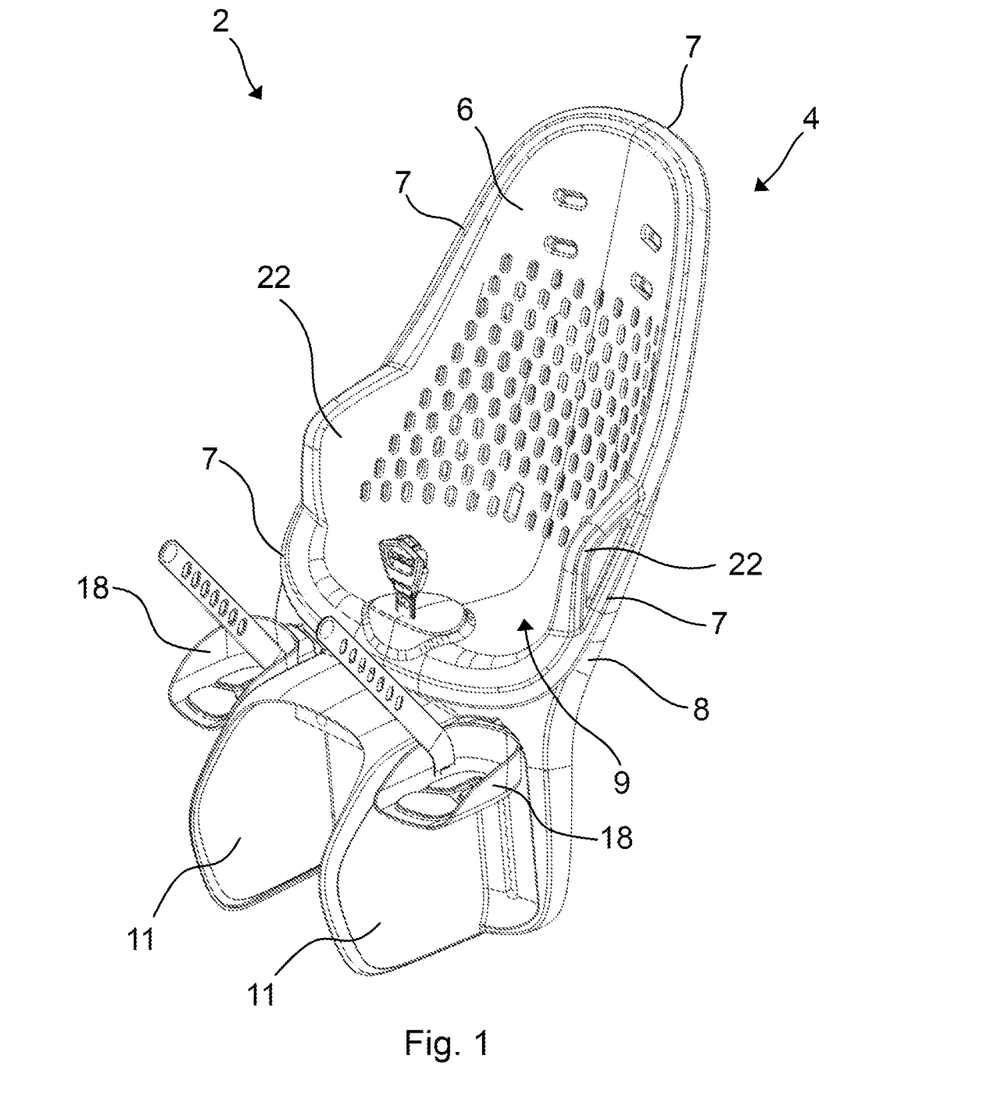
FIG. 1 shows a rear child bike seat according to an embodiment of the present disclosure in a perspective view.

FIG. 1 shows a rear child bike seat 2. The rear child bike seat 2 comprises a seat body 4 for accommodating and supporting a child (not shown) therein when sitting in the rear child bike seat 2. The seat body 4 comprises a seat shell 6 made of a soft material that may provide a comfortable seat cushion for the child when sitting in the rear child bike seat 2. The seat body 4 further comprises a support structure 8 for supporting the seat shell 6. The seat shell 6 has an edge portion 7 that may extend along an outer boundary of the seat body 4 and the support structure 8, respectively.

The edge portion 7 may be sandwiched between two parts of a support structure 8 for holding the seat shell 6 on the support structure 8. Alternatively or additionally, the edge portion 7 may be partly wrapped around at least one part of the support structure 8 for holding the seat shell 6 on the support structure 8. Hence, the edge portion 7 may be formed as an edge of the seat body 4 surrounding a sitting portion 9 of the rear child bike seat 2.

The rear child bike seat 2 may further comprise two arm rest portions 22 that may be an integral part of the seat shell 6. Each arm rest portion 22 may protrude outwards. The arm rest portions 22 may be arranged such that the arm rest portions 22 and the sitting portion 9 merge at least partly seamlessly or flush.

The rear child bike seat 2 may further comprise two separate leg supports 11 each for supporting a leg of the child when sitting in the rear child bike seat 2. Each of the leg supports 11 may be attached to the support structure 8. The leg supports 11 may further be arranged and/or configured for additionally sandwiching or clamping the edge portion 7 with at least one part of the support structure 8. Furthermore, the leg supports 11 may each comprise an adjustable foot support 18 each for providing a footrest for the feet of the child when sitting in the rear child bike seat 2. The foot supports 18 may be arranged below the seat shell 6 and are height adjustable.

Figure 2:
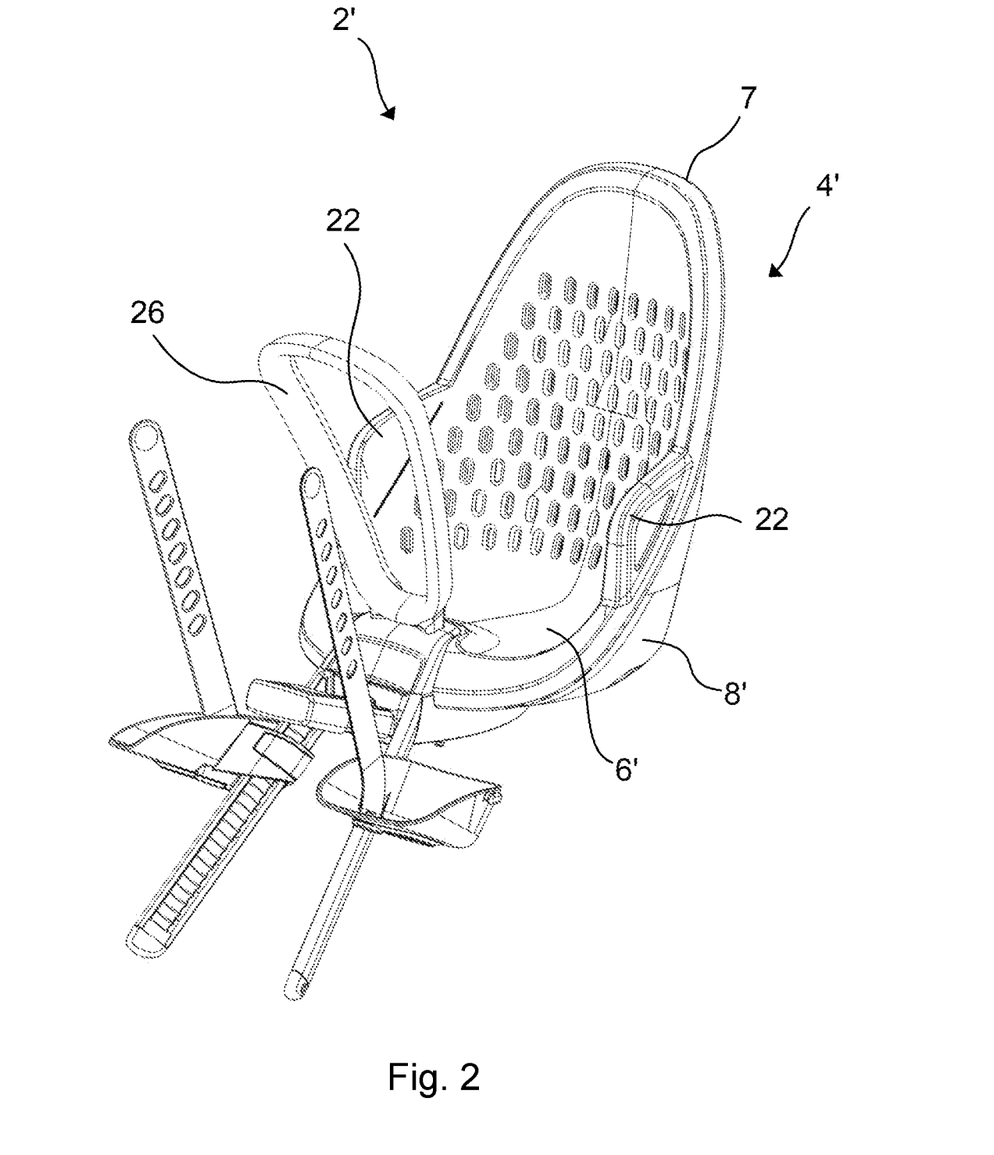
FIG. 2 shows a front child bike seat according to an embodiment of the present disclosure in a perspective view.

FIG. 2 shows a front child bike seat 2'. The front child bike seat 2' also comprises a seat body 4' for accommodating and supporting a child (not shown) therein when sitting in the front child bike seat 2'. The front child bike seat 2' further comprises a support structure 8' for supporting the seat shell 6'. The seat body 4' may comprise at least one of the components of the seat body 4 of the rear child bike seat 2 and may be at least partly configured like the seat body 4 of the rear child bike seat 2. An edge portion 7' of a seat shell 6' of the seat body 4' may be arranged as described with respect to the rear child bike seat 2. The front child bike seat 2' may additionally comprise a central frame portion 26 being arranged so as to be positioned between the child's legs when the child is sitting in the front child bike seat 2'.

Figure 3:
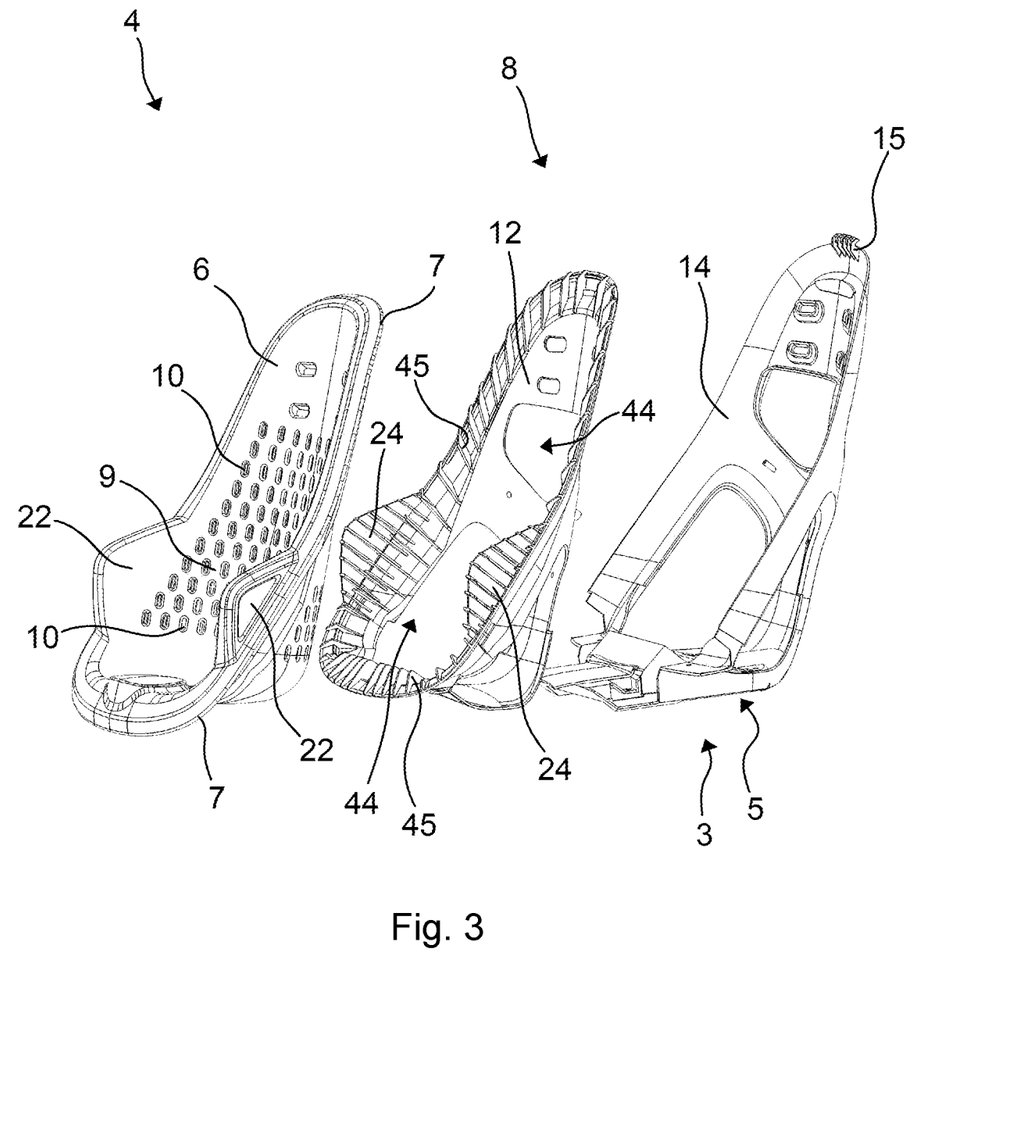
FIG. 3 shows a seat body of the rear child bike seat of FIG. 1 in an exploded view.

FIG. 3 shows three components of the seat body 4 of the rear child bike seat 2 in an exploded view. The seat shell 6 may be a first component of the seat body 4. The seat shell 6 may be integrally formed and may be made of an ethylene-vinyl acetate material. The seat shell 6 comprising the edge portion 7 may comprise a plurality of holes 10 that may be arranged within the sitting portion 9.

The support structure 8 may comprise two further components of the seat body 4. The support structure 8 may comprise a frame part 12 for supporting the seat shell 6 and a cover part 14. The frame part 12 and the cover part 14 may be a second and third component of the seat body 4. The cover part 14 may be configured such that it at least partly covers the frame part 12.

The frame part 12 may comprise at least one reinforcement rib 45, preferably multiple reinforcement ribs 45 arranged along an outer rim or edge of the frame part 12, for reinforcing the frame part 12 in an edge portion thereof. The stiffness of the frame part 12 may be increased by further reinforcement ribs 45 including reinforcing ribs that extend in or into the below described arm rest protrusions. Some or all of the reinforcement rib or ribs 45 can be arranged substantially perpendicular to the edge of the frame part 12 and/or some or all of the reinforcement ribs may be arranged such that their extension planes extend through a common center point. The frame part 12 may further comprise at least one recess 44 for reducing the weight of the child bike seat 2, 2' while not substantially reducing the stiffness of the frame part 12 and the child bike seat.

The frame part 12 may comprise arm rest protrusions 24 that protrude outwards from an edge portion of the frame part 12. The arm rest protrusions 24 may protrude into the arm rest portions 22 of the seat shell 6. Hence, the arm rest protrusions 24 may at least partially fill the arm rest portions 22 of the seat shell 6, wherein the arm rest portions 22 may accommodate the arm rest protrusions 24. The arm rest protrusions 24 may also comprise at least one reinforcement rib for stiffening the arm rest protrusions 24 that might be exposed to loads during a bicycle ride when the child is pulling or pushing the arm rest portions 22 of the seat shell 6.

The cover part 14 of the support structure 8 may further comprise a child bike seat mount 3. The child bike seat mount 3 may be arranged on a base portion of the cover part 14, the support structure 8 and the seat body 4 of the rear child bike seat 2, respectively. The child bike seat mount 3 may comprise a coupling portion 5 that is configured to be couplable with at least two different fixation modules for coupling said child bike seat mount 3 to a bike (not shown). The child bike seat mount 3 and different fixation modules are described with respect to FIGS. 5 to 7.

The cover part 14 may further comprise a hook 15 for hooking the cover part 14 into the frame part 12 for assembling the seat body 4. The cover part 14 may further be configured to cover the outer side of the frame part 12 that is not covered by the seat shell 6 partly or entirely. The edge portion 7 of the seat shell 6 may be sandwiched or clamped between the frame part 12 and the cover part 14.

Figure 4:
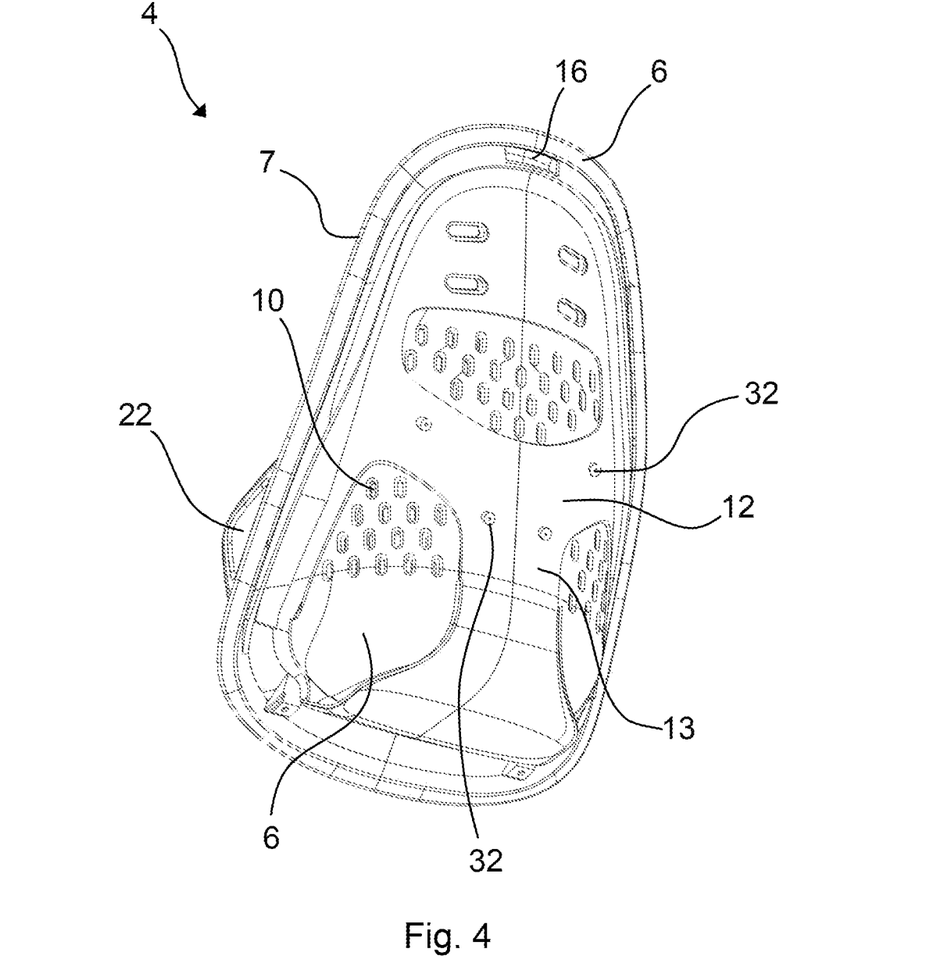
FIG. 4 shows the seat body of the rear child bike seat of FIG. 1 in a perspective view from behind.

FIG. 4 shows the seat shell 6 and the frame part 12 of the seat body 4 of the rear child bike seat 2. The edge portion 7 of the seat shell 6 may be wrapped around the entire outer boundary of the frame part 12 as shown in FIG. 4. Alternatively, the edge portion 7 of the seat shell 6 may be partly wrapped around the outer boundary of the frame part 12. The edge portion 7 of the seat shell 6 may be wrapped around an upper part of the outer boundary of the frame part 12. Alternatively or additionally, the edge portion 7 of the seat shell 6 may be wrapped around a lower part of the outer boundary of the frame part 12. Alternatively or additionally, the edge portion 7 of the seat shell 6 may be wrapped around at least one lateral part, for example a right part and/or a left part of the outer boundary of the frame part 12.

The frame part 12 may further comprise at least one mounting hole 32 for mounting the cover part 14 to the frame part 12. A mounting means, for example a screw, for mounting the cover part 14 to the frame part 12 may be inserted and may be accessible via one of the holes 10 of the seat shell 6. Thus, the frame part 12 and the cover part 14 may be screwed together according an embodiment. The frame part 12 may further comprise a hook recess 16 corresponding to the hook 15 arranged on the cover part 14 for hooking the latter to the frame part 12.

The frame part 12 may comprise a skeleton frame structure with at least one recess 44. The frame part 12 may comprise a Y-shaped skeleton portion 13 for stiffening the frame structure of the frame part 12.

Figure 5:
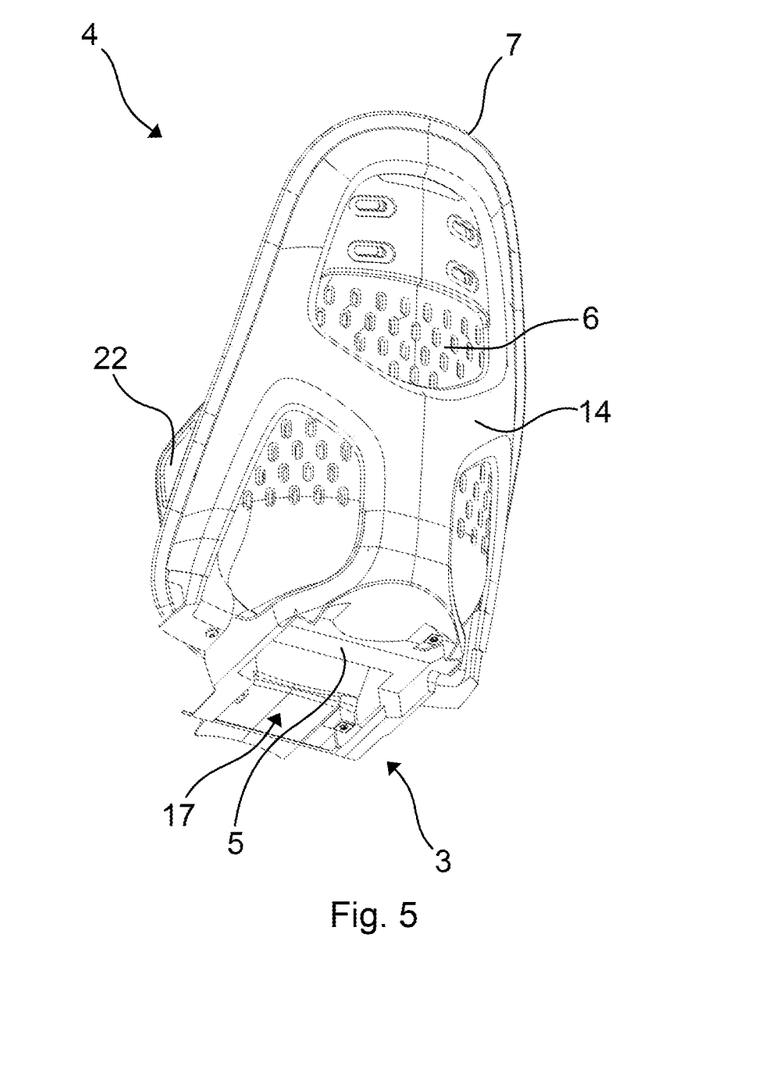
FIG. 5 shows the seat body of the rear child bike seat of FIG. 1 with a child bike seat mount according to an embodiment of the disclosure in a perspective view from behind.

FIG. 5 shows the seat shell 6 and the cover part 14 of the seat body 4 of the rear child bike seat 2. The cover part 14 may at least partly cover the frame part 12 from the rear side of the frame part 12. The seat shell 6 may further cover the frame part 12 from the front side of the frame part 12. Thus, the frame part 12 may be sandwiched between the seat shell 6 and the cover part 14. According to a preferable embodiment, the cover part 14 does not comprise a mounting hole for mounting the cover part 14 to the frame part 12 on an exposed rear side of the cover part 14 facing away from the frame part 12.

The edge portion 7 of the seat shell 6 that may be wrapped around the entire outer boundary of the frame part 12 or that may be partly wrapped around the outer boundary of the frame part 12 may be sandwiched or clamped between the frame part 12 and the cover part 14. The cover part 14 may further at least partly cover the wrapped around edge portion 7 of the seat shell 6.

Figure 6:
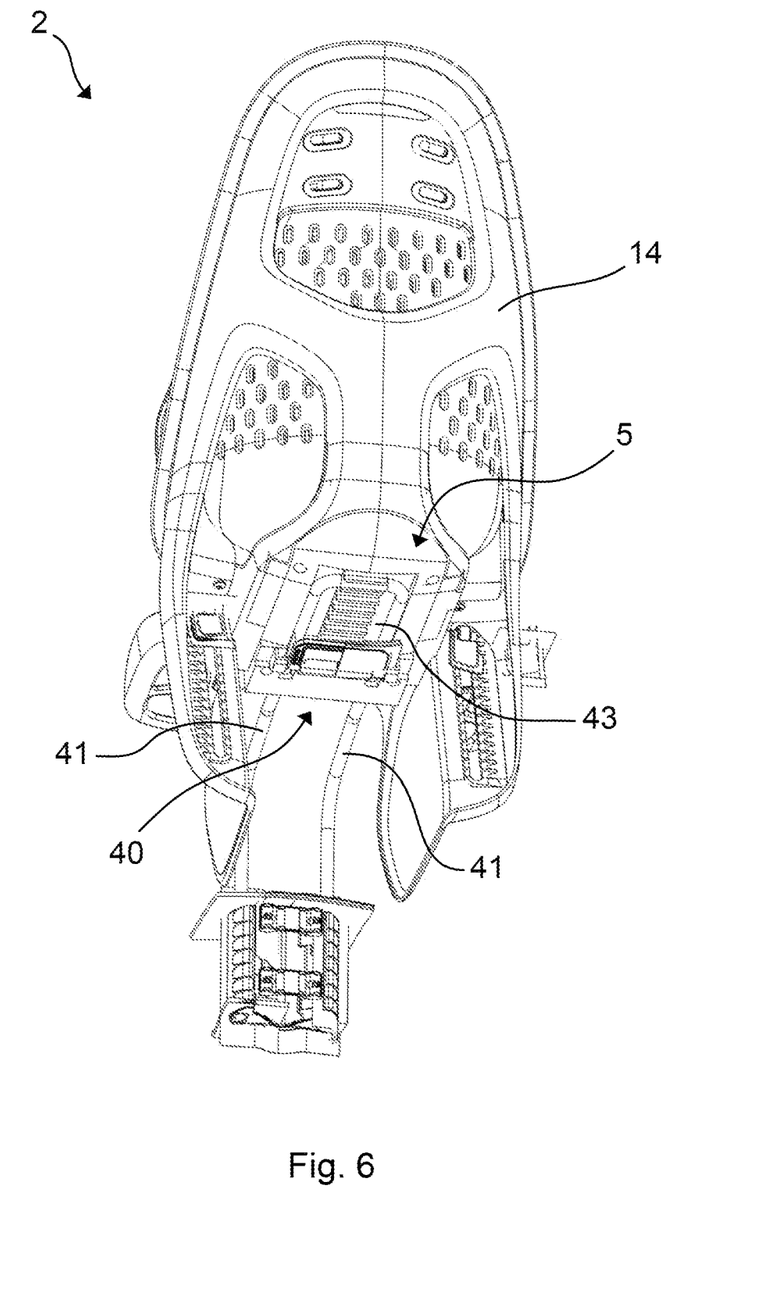
FIG. 6 shows the seat body of the rear child bike seat of FIG. 1 in a perspective view from behind with a first fixation module for coupling the rear child bike seat to a bike.
Figure 7:
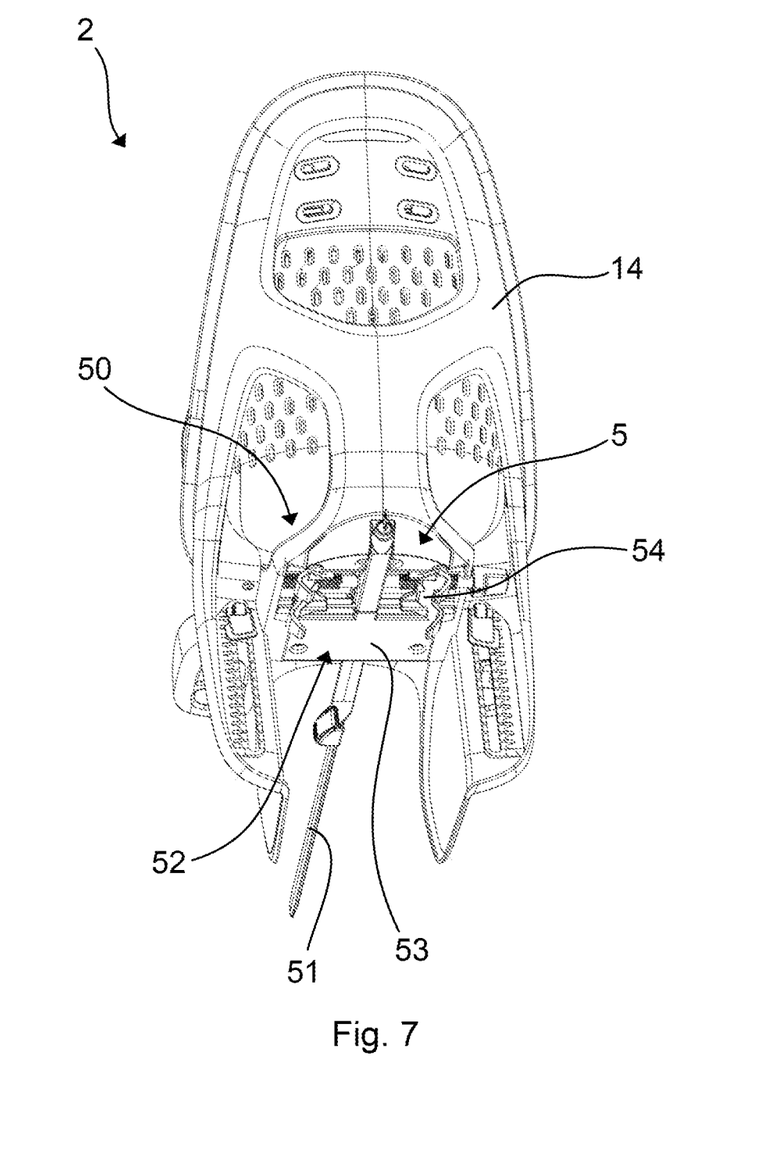
FIG. 7 shows the seat body of the rear child bike seat of FIG. 1 in a perspective view from behind with a second fixation module for coupling the rear child bike seat to a bike.

The coupling portion 5 of the child bike seat mount 3 may comprise a receiving portion 17 for receiving the at least two different fixation modules shown in FIGS. 6 and 7. The receiving portion 17 may be configured for receiving a coupling portion 5 shown in FIGS. 6 and 7 of one of the two different fixation modules. According to an embodiment, the receiving portion 17 may comprise at least one female fixation element, for example an internal thread, for receiving at least one male fixation element, for example a screw, wherein the at least two different fixation modules may be fixed to the receiving portion 17 by mating the at least one female fixation element and the at least one male fixation element. Additionally or alternatively, the receiving portion 17 may comprise a guiding groove or track for slidingly receiving one of the at least two different fixation modules.

FIG. 6 shows the rear child bike seat 2 with a fixation module 40 for coupling the rear child bike seat 2 to a bike frame (not shown) of the bike. The fixation module 40 may be a first fixation module 40. The fixation module 40 may comprise a frame clamping element 42 for clamping the rear child bike seat 2 to the bike frame. The fixation module 40 may further comprise at least one rod 41 connecting the frame clamping element 42 with a coupling element 43 for coupling the fixation module 40 with the cover part 14 of the rear child bike seat 2. The at least one rod 41 may be curved, wherein a curved portion of the rod 41 may be engaged with the coupling element 43. The rod 41 may be engaged in an adjustable manner allowing different positions of the frame clamping element 42 relative to the coupling element 43, in particular different positions of the child bike seat 2 in travel direction of the bike.

FIG. 7 shows the rear child bike seat 2 with a fixation module 50 for coupling the rear child bike seat 2 to a luggage rack (not shown) of the bike. The fixation module 50 may be a second fixation module 50. The fixation module 50 may comprise a coupling element 53 for coupling the fixation module 50 with the cover part 14 of the rear child bike seat 2. The coupling elements 43, 53 of both fixation modules 40, 50 as described may substantially comprise the same configuration. The rack clamping element 52 for clamping the rear child bike seat 2 to the luggage rack may be arranged on the coupling element 53. The rack clamping element 52 may comprise a clamping mechanism 54 for a lateral clamping fixation of the further fixation module 50 to the luggage rack. The fixation module 50 may further comprise at least one strap 51 for additionally securing the fixation module 50 when being clamped to the luggage rack.

Figure 8:
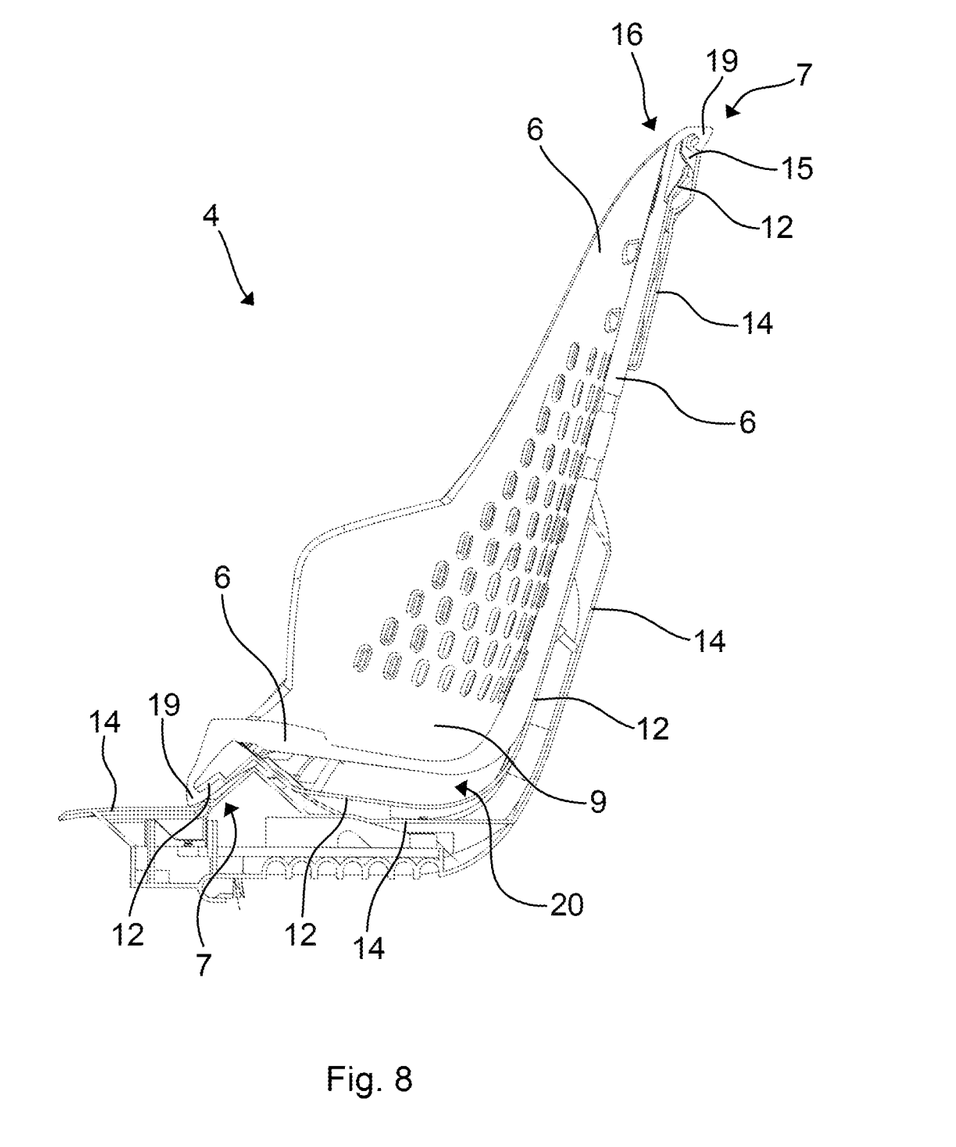
FIG. 8 shows the seat body of the rear child bike seat of FIG. 1 in a vertical sectional view.

FIG. 8 shows the seat body 4 of the rear child bike seat 2 in a vertical sectional view. The seat shell 6 may comprise an outer bulge 19 being wrapped around the frame part 12. The cover part 14 may cover the frame part 12 and may be hooked into the frame part 12 by an engagement of the hook 15 in the hooking recess 16 of the frame part 12.

The seat shell 6 may be spaced from the support structure 8 for providing a compensation space 20 between the seat shell 6 and the support structure 8. The compensation space 20 may be provided between a bottom part of the sitting portion 9 of the seat shell 6 and a bottom part of the frame part 12. The compensation space 20 allows for a floating support of the child when moving up and down during a bike ride.

Figure 9:
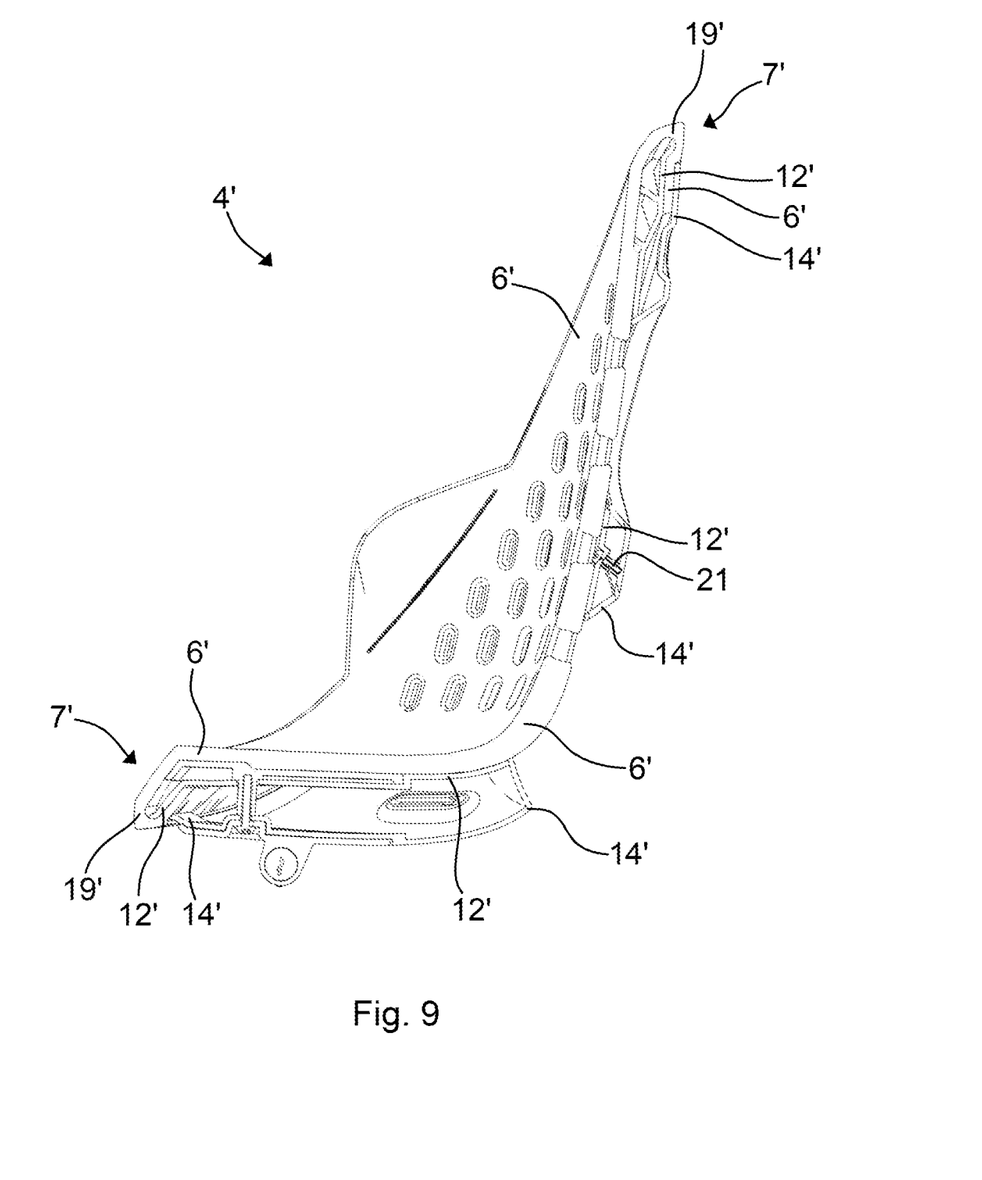
FIG. 9 shows a seat body of the front child bike seat of FIG. 2 in a vertical sectional view.

FIG. 9 shows the seat body 4' of the front child bike seat 2' in a vertical sectional view. The seat shell 6' may comprise an outer bulge 19' being wrapped around the frame part 12'. The cover part 14' may cover the frame part 12'. The cover part 14' may be screwed to the frame part 12' with a hidden screw 21 which is accessible through an opening of seat shell 6'.

In comparison to the rear child bike seat 2, the seat shell 6' of the front child bike seat 2' may not be spaced apart from the support structure 8 for providing a compensation space 20 between the seat shell 6 and the support structure 8 so that the a bottom part of a sitting portion is supported on the support structure 8.

Figure 10:
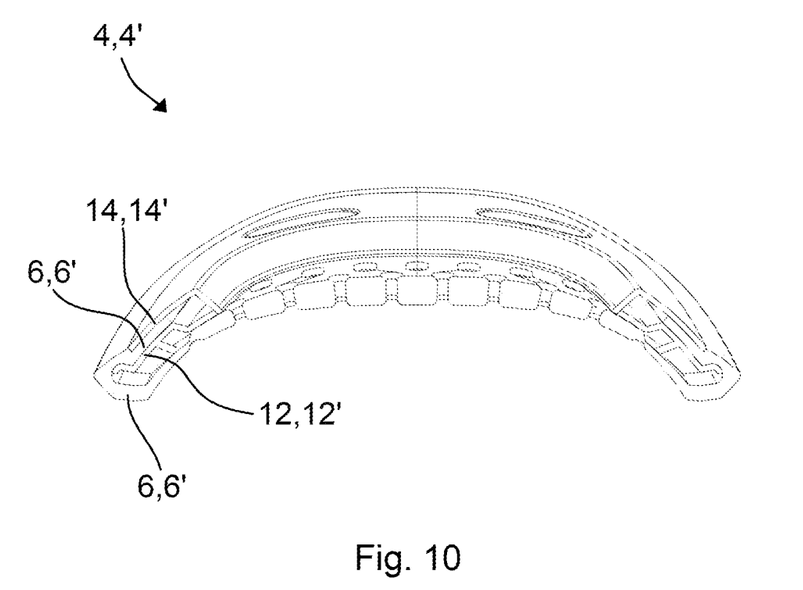
FIG. 10 schematically shows the seat body of the rear child bike seat of FIG. 1 and the front child bike seat of FIG. 2 in a horizontal sectional view.

FIG. 10 shows the seat body 4, 4' of the rear child bike seat 2 and the front child bike seat 2' in a horizontal sectional view.

The edge portion 7, 7' of the seat shell 6, 6' of the child bike seat 2, 2' shown in FIGS. 8 to 10 is sandwiched between the frame part 12, 12' and the cover part 14, 14' in an upper region, a lower region and lateral regions of the seat shell 6, 6'. The edge portion 7, 7' of the seat shell 6, 6' of the child bike seat 2, 2' shown in FIGS. 8 to 10 may additionally be clamped by the frame part 12, 12' and the cover part 14, 14' where a respective sandwiching takes place.

The edge portion 7, 7' of the seat shell 6, 6' of the child bike seat 2, 2' is sandwiched between the frame part 12, 12' and the cover part 14, 14'. The edge portions 7, 7' of the seat shells 6, 6' of the child bike seats 2, 2' shown in FIGS. 8 and 9 may additionally be clamped by the frame part 12, 12' and the cover part 14, 14' where sandwiching takes place.

Possible mounting steps for assembling child bike seats as described above will be described in the following.

First, the frame part 12 can be provided and then the seat shell 6 may be arranged on the frame part 12 by wrapping the edge portion 7 of the seat shell around the frame part. After that, the cover part 14 can be mounted to the frame part 12 such that the edge portion 7 of the seat shell 6 is sandwiched between the frame part 12 and the cover part 14 so that the frame part 12 and the cover part 14 form the support structure 8 on which the seat shell 6 is held.

Alternatively, the frame part 12 can be provided and then the seat shell 6 may be arranged on the frame part 12 by partly wrapping the edge portion 7 of the seat shell around the frame part. After that, the cover part 14 can be mounted to the frame part 12 such that the frame part 12 and/or the seat shell 6 are at least partly covered with the cover part 14. The cover part 14 may be mounted to the frame part 12 such that an edge portion 7 of the seat shell 6 is sandwiched between the frame part 12 and the cover part 14, wherein the frame part 12 and the cover part 14 form the support structure 8 on which the seat shell 6 is held.

The mounting steps may comprise the step of hooking the cover part 14 into the frame part 12, preferably an upper portion of the frame part, and pivoting the cover part 14 onto the frame part 12. After the cover part 14 is arranged on the frame part 12, a positive locking coupling between the frame part 12 and the cover part 14 by means of a snap-fit coupling and/or a screw coupling as shown for example in FIG. 9 is established.

Further aspects, configurations or embodiments of the present disclosure may be gained by combining any feature or any combination of features of the rear child bike seat 2 with any other feature or any other combination of features of the front child bike seat 2'.

REFERENCE SIGNS 2 rear child bike seat
2' front child bike seat
3 child bike seat mount
4, 4' seat body
5 coupling portion
6, 6' seat shell
7, 7' edge portion
8, 8' support structure
9 sitting portion
10 hole
11 leg support
12, 12' frame part
13 Y-shaped skeleton portion
14, 14' cover part
15 hook
16 hook recess
17 receiving portion
18 foot support
19, 19' outer bulge
20 compensation space
21 hidden screw
22 arm rest portion
24 arm rest protrusion
26 frame portion
32 mounting hole
40 first fixation module
41 rod
42 frame clamping element
43, 53 coupling element
44 recess
45 reinforcement rib
50 second fixation module
51 strap
52 rack clamping element
54 clamping mechanism

What is claimed is:

1. A child bike seat, comprising:
a seat body comprising:
a seat shell for accommodating a child therein; and
a support structure for supporting the seat shell, the support structure comprising a first part and a second part,
wherein the seat shell is nested within the first part of the support structure, and the first part of the support structure is nested within the second part of the support structure, and
wherein an edge portion of the seat shell is disposed between the first part of the support structure and the second part of the support structure for holding the seat shell on the support structure.

2. The child bike seat according to claim 1, wherein the edge portion of the seat shell is partly wrapped around the first part of the support structure.

3. The child bike seat according to claim 1, wherein the seat shell is configured to contact the child when the child is accommodated therein.

4. A child bike seat, comprising:
a seat body comprising:
a seat shell for accommodating a child therein; and
a support structure for supporting the seat shell, the support structure comprising a frame part for supporting the seat shell and a cover part at least partly covering the frame part, the seat shell, or both,
wherein an edge portion of the seat shell is at least partly wrapped around the frame part from a front surface of the frame part to a rear surface of the frame part, and
wherein the edge portion of the seat shell at the rear surface of the frame part is disposed between the frame part and the cover part of the support structure.

5. The child bike seat according to claim 4, wherein the edge portion of the seat shell is wrapped around the frame part around an outer boundary of the frame part.

6. The child bike seat according to claim 4, wherein the frame part at least partially comprises a Y-shaped skeleton portion.

7. The child bike seat according to claim 4, wherein:
the frame part and the cover part are fixedly coupled to each other by a positive locking coupling,
the frame part comprises a mounting hole and the cover part comprises a receiving portion in which a fixation means inserted in the mounting hole is received, and
the mounting hole is arranged such that the inserted fixation means is accessible via an opening provided in the seat shell.

8. The child bike seat according to claim 7, wherein the positive locking coupling is a snap-fit coupling, a screw coupling, or both.

9. The child bike seat according to claim 4, wherein the seat shell comprises a polymer material, and wherein at least one part of the frame part and the cover part of the support structure is made of a plastics material or a composite material.

10. The child bike seat according to claim 4, wherein a child seating area of the seat shell is spaced apart from the support structure for providing a compensation space between the child seating area and the support structure, the compensation space allowing a floating movement of a child sitting on the child seating area.

11. The child bike seat according to claim 4, wherein the seat shell comprises arm rest portions and the support structure comprises arm rest protrusions protruding into and being at least partly received in the arm rest portions.

12. The child bike seat according to claim 4, wherein the support structure comprises at least one reinforcement element for reinforcing the support structure at least in an edge portion thereof.

13. The child bike seat according to claim 4, further comprising a child bike seat mount comprising a coupling portion configured to be coupled to at least two different fixation modules for coupling the child bike seat mount to a bike.

14. The child bike seat according to claim 13, wherein the at least two different fixation modules comprise a first fixation module for coupling the child bike seat to a bike frame of the bike and a second fixation module for coupling the child bike seat to a luggage rack of the bike.

15. A method of assembling a child bike seat, the method comprising:
providing a frame part;
arranging a seat shell for accommodating a child therein on the frame part such that the seat shell is nested within the frame part; and
mounting a cover part to the frame part such that the frame part is nested within the cover part and such that an edge portion of the seat shell is disposed between the frame part and the cover part,
wherein the arranging step comprises partly wrapping the edge portion of the seat shell around the frame part.

16. The method according to claim 15, wherein the frame part and the cover part form a support structure on which the seat shell is held.

17. The method according to claim 15, wherein the mounting comprises hooking the cover part into the frame part and pivoting the cover part onto the frame part.

18. The method according to claim 15, wherein the mounting comprises establishing a positive locking coupling between the frame part and the cover part.

19. The method according to claim 18, wherein the positive locking coupling comprises a snap-fit coupling, a screw coupling, or both.

* * * * *